(12) United States Patent
Hanaoka et al.

(10) Patent No.: US 11,750,019 B2
(45) Date of Patent: Sep. 5, 2023

(54) POWER MANAGEMENT APPARATUS, POWER DISTRIBUTION CONTROL METHOD AND PROGRAM

(71) Applicant: NIPPON TELEGRAPH AND TELEPHONE CORPORATION, Tokyo (JP)

(72) Inventors: Naoki Hanaoka, Musashino (JP); Toshimitsu Tanaka, Musashino (JP); Hidetoshi Takada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/759,198

(22) PCT Filed: Feb. 13, 2020

(86) PCT No.: PCT/JP2020/005614
§ 371 (c)(1),
(2) Date: Jul. 21, 2022

(87) PCT Pub. No.: WO2021/161464
PCT Pub. Date: Aug. 19, 2021

(65) Prior Publication Data
US 2023/0050747 A1 Feb. 16, 2023

(51) Int. Cl.
H02J 7/34 (2006.01)
H02J 7/00 (2006.01)
(Continued)

(52) U.S. Cl.
CPC ............... H02J 7/342 (2020.01); H02J 3/32 (2013.01); H02J 3/36 (2013.01); H02J 7/0047 (2013.01);
(Continued)

(58) Field of Classification Search
CPC ...... H02J 7/34; H02J 7/342; H02J 3/32; H02J 3/36; H02J 7/0047; H02J 7/00; H02J 2207/20; H02J 2300/24
See application file for complete search history.

(56) References Cited

U.S. PATENT DOCUMENTS

| 2015/0255986 A1 | 9/2015 | Kobayashi |
| 2019/0086891 A1 | 3/2019 | Kawamoto et al. |
| 2020/0059100 A1 | 2/2020 | Kawamoto |

FOREIGN PATENT DOCUMENTS

| JP | 2006-288162 | 10/2006 |
| WO | 2014/057601 | 4/2014 |

(Continued)

OTHER PUBLICATIONS

"Sakura Internet Opens Solar Power Plant in IshikariCity, Hokkaido—Challenge to utilize renewable energy at Ishikari Data Center-", Aug. 10, 2015, https://www.sakura.ad.jp/information/wp-content/uploads/2017/10/20150810_photovoltaic.pdf.

Primary Examiner — Robert L Deberadinis
(74) Attorney, Agent, or Firm — IPUSA, PLLC

(57) ABSTRACT

Provided is a power management apparatus for controlling power distribution from a location that includes a storage battery and a current control type converter to another location that includes a storage battery, the power management apparatus including: a monitor unit that acquires a status of the storage battery at each location; a judgment unit that determines, based on the status of the storage battery at each location that has been acquired by the monitor unit, a duration of power distribution to a certain location, and one or more locations from which power is to be distributed to the certain location; and a control unit that controls each location serving as a distribution source such that power distribution is performed for the duration determined by the judgment unit.

5 Claims, 11 Drawing Sheets

(51) Int. Cl.
*H02J 3/32* (2006.01)
*H02J 3/36* (2006.01)
(52) U.S. Cl.
CPC ....... *H02J 2207/20* (2020.01); *H02J 2300/24* (2020.01)

(56) References Cited

FOREIGN PATENT DOCUMENTS

| WO | 2017/199604 | 11/2017 |
| WO | 2018/173546 | 9/2018 |

Fig. 10

|  | FIG. 6 (1 LINE, 1 HOUR) | FIG. 7 (2 LINES) | FIG. 8 (2 HOURS) | FIG. 9 (INVERSE RATIO) |
|---|---|---|---|---|
| CURRENT [A1] | 60 | 30 | 30 | 24 |
| RESISTANCE [Ω1] | 0.1 | 0.1 | 0.1 | 0.12 |
| POWER LOSS [W1] | 720 | 180 | 180 | 138.24 |
| CURRENT [A2] | 0 | 30 | 0 | 36 |
| RESISTANCE [Ω2] | 0.1 | 0.1 | 0.1 | 0.08 |
| POWER LOSS [W1] | 0 | 180 | 0 | 207.36 |
| DURATION [h] | 1 | 1 | 2 | 1 |
| ELECTRIC ENERGY LOSS [Wh] | 720 | 360 | 360 | 345.6 |

POWER MANAGEMENT APPARATUS, POWER DISTRIBUTION CONTROL METHOD AND PROGRAM

TECHNICAL FIELD

The present invention relates to a technology for efficiently distributing electric power.

BACKGROUND ART

At locations such as data centers and telecommunication buildings, power is received from a commercial power source through a power distribution grid and supplied to a consuming device, and in addition to this, often a power generation unit for power generation from natural energy, such as photovoltaics (PV), is provided and power generated by the power generation unit is used. Moreover, a power storage unit (storage battery) is also often provided in order to prepare for a disaster and the like.

As an example configuration of such location, NPL 1 discloses a high voltage direct current (HVDC) power supply system that supplies DC power to a server without converting it to AC power. In this power supply system, priority control is performed such that power is supplied from a power generation unit while the power generation unit is generating power, but if the power generation unit stops generating power, power is supplied from a commercial power source, and in the event of a power outage, power is supplied from a power storage unit.

Moreover, a technology for interchanging power between a plurality of locations by connecting the locations via privately-owned power lines (a power grid prepared separately from an AC power distribution grid) has recently been proposed.

CITATION LIST

Non Patent Literature

[NPL 1] SAKURA Internet Inc., Ishikari data center: press release (Aug. 10, 2015)
https://www.sakura.ad.jp/information/wp-content/uploads/2017/10/20150810_photovoltaic.pdf

SUMMARY OF THE INVENTION

Technical Problem

In priority control using a conventional technology such as that disclosed in NPL 1, voltage control type converters are used, and therefore, power from a power supply device of the highest voltage is preferentially supplied. For this reason, detailed control, such as sharing between power supply sources (e.g., simultaneous power supply from a power source A and a power source B) and efficient power supply (e.g., low current power supply), is difficult, and there is a problem in that there is a limit to the reduction in power loss.

The present invention was made with the foregoing in view, and it is an object thereof to provide a technology that enables flexible control of power distribution between locations and therefore a reduction in power loss during distribution.

Means for Solving the Problem

According to the technology disclosed herein, there is provided a power management apparatus for controlling power distribution from a location that includes a storage battery and a current control type converter to another location that includes a storage battery, the power management apparatus including:

a monitor unit that acquires a status of the storage battery at each location;

a judgment unit that determines, based on the status of the storage battery at each location that has been acquired by the monitor unit, a duration of power distribution to a certain location, and one or more locations from which power is to be distributed to the certain location; and a control unit that controls each location serving as a distribution destination such that power distribution is performed for the duration determined by the judgment unit.

Effects of the Invention

According to the technology disclosed herein, there is provided a technology that enables flexible control of power distribution between locations and therefore a reduction in power loss during distribution.

BRIEF DESCRIPTION OF DRAWINGS

FIG. 10 is a summarizing table.

DESCRIPTION OF EMBODIMENTS

Hereinafter, an embodiment of the present invention will be described with reference to the drawings. The embodiment that will be described below is merely an example, and embodiments to which the present invention is applicable are not limited to the following embodiment.

The present embodiment assumes a mode in which power stored in a storage battery at a certain location is distributed to another location to thereby charge a storage battery at the other location, or in other words, a mode in which storage batteries are actively operated. However, the technology according to the present embodiment is also applicable to a mode in which power is distributed from a power supply device that is not a storage battery and supplied directly to a load that is not a storage battery. Moreover, it is also applicable to a mode in which power is distributed from a storage battery and supplied to a load that is not a storage battery. Furthermore, it is also applicable to a mode in which power is distributed from a power supply device that is not a storage battery and used to charge a storage battery.

System Configuration

Figure 1:
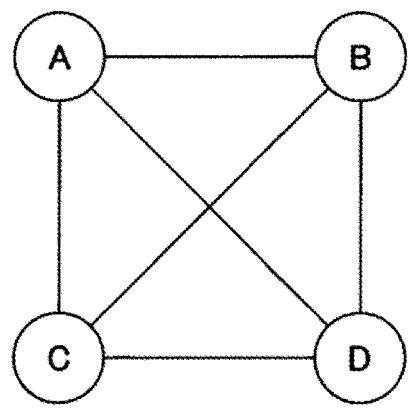
FIG. 1 is a diagram showing an example of a power grid.

In the present embodiment, a power grid to be controlled is assumed to be a microgrid such as that shown in FIG. 1, for example. The microgrid shown in FIG. 1 has four locations A to D, which are connected to each other via power distribution cables, and DC power distribution (power interchange) between the locations is possible.

Each location is assumed to be a building such a telecommunication building or a data center, but this assumption is for illustrative purposes only. The "location" may be smaller than a building (e.g., a single floor, a single room, or the like), or may be larger than a building (e.g., a group of buildings, a town, a city, a prefecture, a region, or the like).

In the present embodiment, power transmission and reception between locations is performed using direct current, and therefore, the microgrid in FIG. 1 may be referred to as a "DC microgrid". Note that the technology according to the present invention is applicable not only to direct current but also to alternating current.

Figure 2:
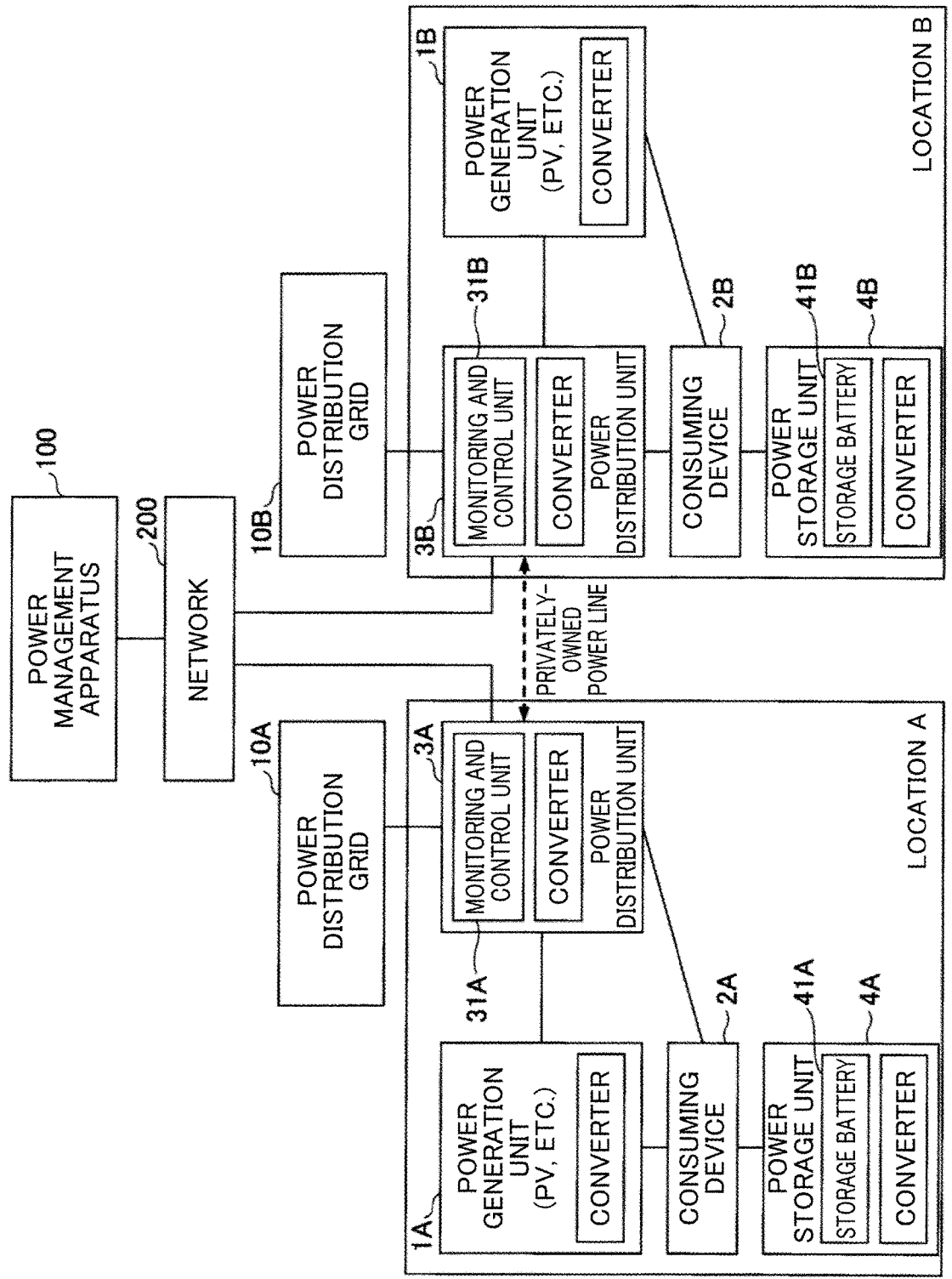
FIG. 2 is a diagram showing a system configuration of an embodiment of the present invention.

FIG. 2 shows an example configuration of a power system of the present embodiment. As shown in FIG. 2, the present power system has a configuration in which locations A and B are connected to each other via a privately-owned power line.

As shown in FIG. 2, the location A includes a power generation unit 1A that generates power from natural energy such as sunlight, a consuming device 2A constituting a load that consumes power, a power storage unit 4A constituted by a storage battery 41A that stores power, and a power distribution unit 3A connected to a power distribution grid 10A provided by an electric power company or the like. The power storage unit 4A may be an EV (electric vehicle), or an EV may be connected in addition to the power storage unit 4A.

The power generation unit 1A and the power storage unit 4A include respective current control type converters. The power distribution unit 3A that receives commercial power includes a rectifier and a current control type converter. The use of current control type converters enables control based on current values.

For example, in the case where power is desired to be distributed from the storage battery 41A at a certain current value, this current value can be set for the current control type converter that is connected to the storage battery 41A. The current control type converter automatically controls voltage such that this current value is achieved. Thus, more flexible and detailed control can be performed. Hereinafter, a current control type converter will be referred to as a "converter". A section (rectifier+converter) that receives commercial power from a power distribution grid 10 and supplies it to a destination within the location may also be referred to as a "commercial power source".

The consuming device 2A may be a network device such as a router, a server that processes data, or the like, for example. The consuming device 2A may also be a server on which a virtual machine runs. The location B has a similar configuration to that of the location A.

The power distribution unit 3A can receive power (commercial power) supplied from the power distribution grid 10A and supply the received power to the consuming device 2A and the power storage unit 4A. Moreover, for example, when the amount of power generated by the power generation unit 1A is greater than the amount of power consumed by the consuming device 2A, the power distribution unit 3A can also distribute the surplus power to the power distribution grid 10A or another location (e.g., the location B). Conversely, the power distribution unit 3A can receive power supplied from another location (e.g., the location B) and supply the received power to the consuming device 2A and the power storage unit 4A. Supplying power from one location to another location can also be said as "interchanging" power.

Furthermore, transferring the load on the consuming device 2A to another location (the location B) (e.g., transferring a virtual machine to a consuming device 2B) is also possible, and this is an example of interchanging power from another location to the location A.

As shown in FIG. 2, a power management apparatus 100 is provided. The power distribution unit 3A at the location A has a monitoring and control unit 31A constituted by a voltmeter, an ammeter, an electric energy meter, a converter setting and control function, and the like. The power distribution unit 3A having the monitoring and control unit 31A is communicably connected to the power management apparatus 100 via a network 200. The same applies to the location B.

Note that, although FIG. 2 shows the locations A and B, there are actually more locations, which are each connected to the power management apparatus 100. Moreover, although the power management apparatus 100 in the example shown in FIG. 2 is provided outside the locations A and B, the power management apparatus 100 may be provided within one of the locations (e.g., within the location A). Furthermore, there may be a location that is not provided with a power generation unit. In the case where the functions of the power management apparatus 100 are provided within a location, a monitoring and control unit 31 within that location performs similar processing to that of the power management apparatus 100.

The power management apparatus 100 controls power distribution from one or more locations to another location. The control content includes the duration of power distribution, the power sharing ratio, and the like. Details of the control content will be described later.

Note that the power distribution control according to the present embodiment is not limited to power distribution between locations in geographically distance places. The power distribution control according to the present embodiment can be executed even within a building, for example.

Figure 3:
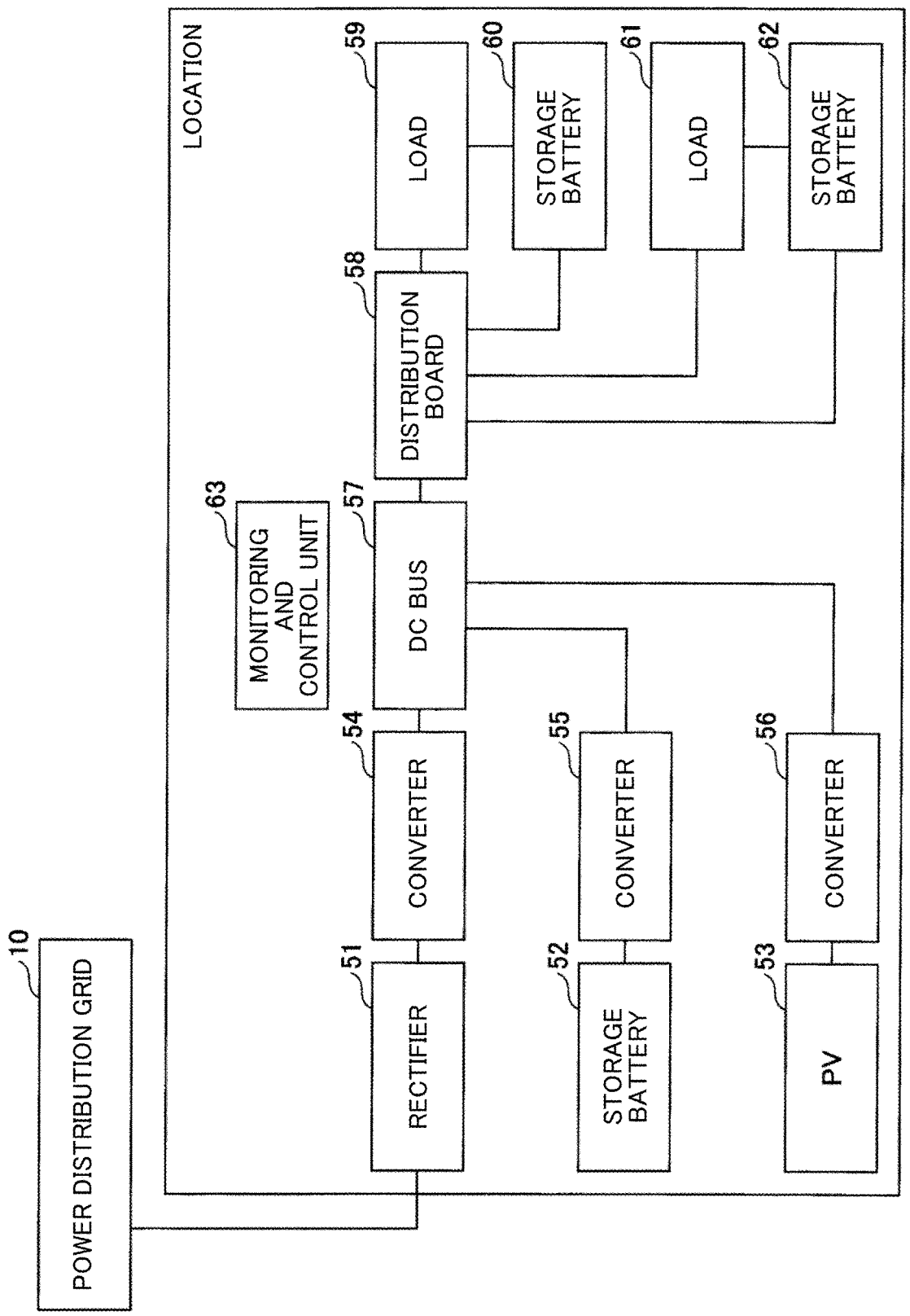
FIG. 3 is a diagram showing an example system configuration within a location.

FIG. 3 shows an example system configuration within a building. As shown in FIG. 3, a rectifier 51, a storage battery 52, a PV 53 (photovoltaics, etc.), converters 54 to 56, a DC bus 57, a distribution board 58, loads 59 and 61, storage batteries 60 and 62, and a monitoring and control unit 63 are provided. The monitoring and control unit 63 may be connected to the power management apparatus 100, send measured values to the power management apparatus 100, and receive instructions from the power management apparatus 100, or the monitoring and control unit 63 itself may have the functions of the power management apparatus 100.

In this configuration, based on control by the monitoring and control unit 63, when the load 59, for example, is not much used (when its load factor is low), power supply to the storage battery 60 that is connected to the load 59 is preferentially performed. In this case, for example, if the storage battery 52 that is located on the power supply side has a high state of charge (e.g., state of charge≥threshold value), power is supplied from the storage battery 52.

At this time, power supply is performed for as long a duration as possible, as will described later. Moreover, if the PV 53 has surplus power, power supply to the storage battery 60 may be performed from both the PV 53 and the storage battery 52. Then, when the load factor of the load 59 becomes high, the storage battery 60 can supply power to the load 59. In this manner, the amount of current flowing through the DC bus 57 can be reduced, and power loss can thus be reduced.

Note that, in the configuration in FIG. 3, since the place (room or the like) where the power sources are located is different from the place (room or the like) where a load and a storage battery are provided, if the place where the power sources are located is regarded as a single location, and the place where the load and the storage battery are provided is regarded as another single location, power distribution control of the configuration in FIG. 3 is also considered an example of power distribution control between locations.

Hereinafter, an apparatus configuration and a processing procedure will be described in greater detail.

Apparatus Configuration

Figure 4:
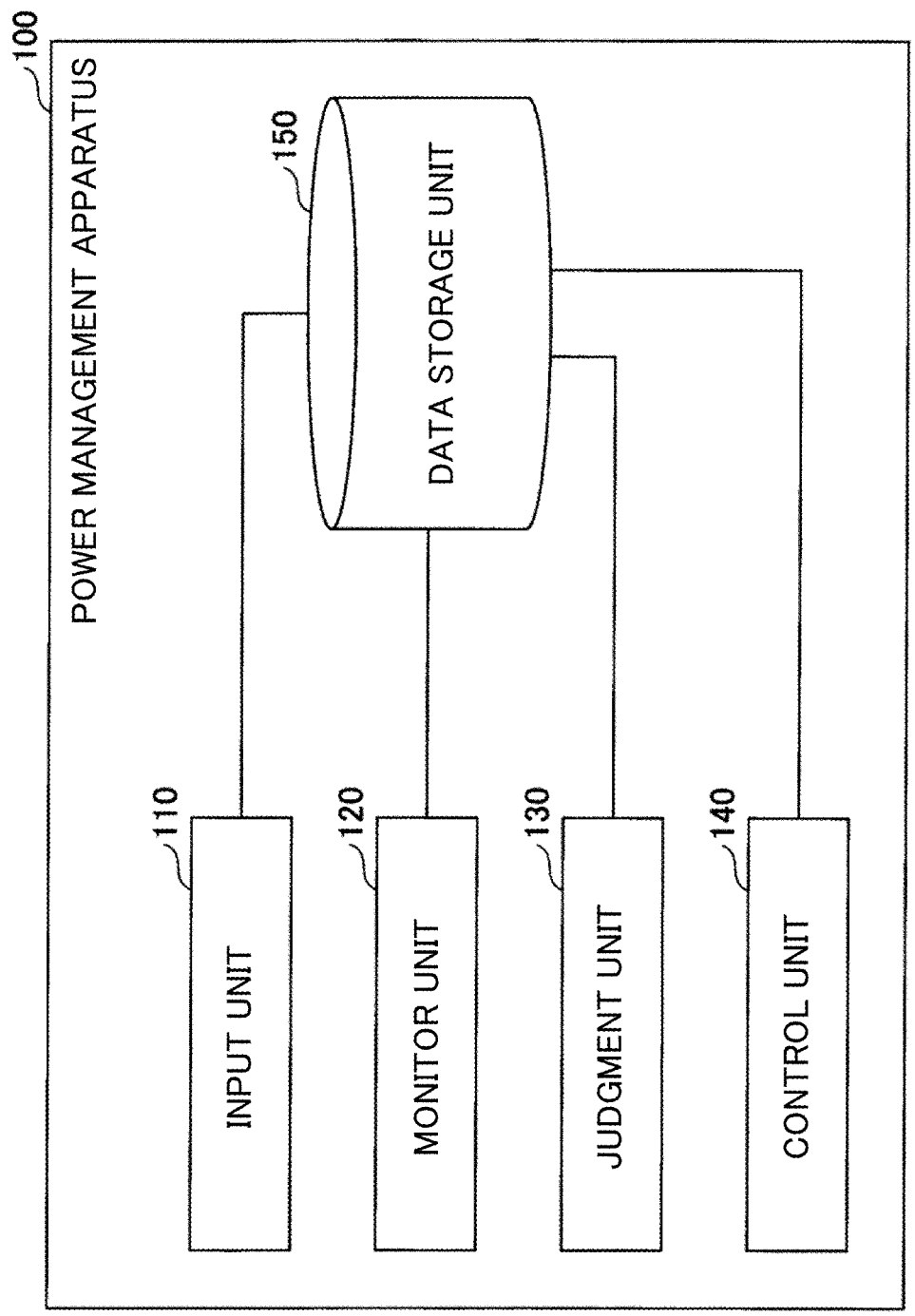
FIG. 4 is a diagram showing a configuration of a power management apparatus.

FIG. 4 is a diagram showing a functional configuration of the power management apparatus 100. As shown in FIG. 4, the power management apparatus 100 includes an input unit 110, a monitor unit 120, a judgment unit 130, a control unit 140, and a data storage unit 150.

The input unit 110 inputs information that needs to be set in advance (information on grid topology, information on facilities at each location, inter-location parameters, consuming device usage schedule, etc.) and stores the information into the data storage unit 150.

The monitor unit 120 acquires current values and voltage values of the facilities (commercial power source, power storage unit, power generation unit, etc.) from each location. Moreover, the monitor unit 120 can also acquire the operating status (CPU utilization, etc.) of each consuming device, the state of charge of each storage battery, and the like. The acquired information is stored in the data storage unit 150.

Based on the information stored in the data storage unit 150, the judgment unit 130 determines a power distribution method (lines used for power distribution, current value for each line, duration, etc.) to use for power distribution from a certain location to another location. The control unit 140 performs control (settings, instructions, etc.) for each location such that power distribution is performed according to the power distribution method determined by the judgment unit 130. The data storage unit 150 stores setting information that has been set in advance, measured values acquired by the monitor unit 120, and the like.

Example Hardware Configuration

The power management apparatus 100 can be realized by, for example, causing a computer to execute a program that describes the processing content illustrated in the present embodiment. Note that the "computer" may be a virtual machine in the cloud. In the case where a virtual machine is used, the "hardware" described here is virtual hardware.

The program can be saved and distributed by being recorded on a computer-readable recording medium (portable memory, etc.). The program can also be provided through a network such as the Internet or email.

Figure 5:
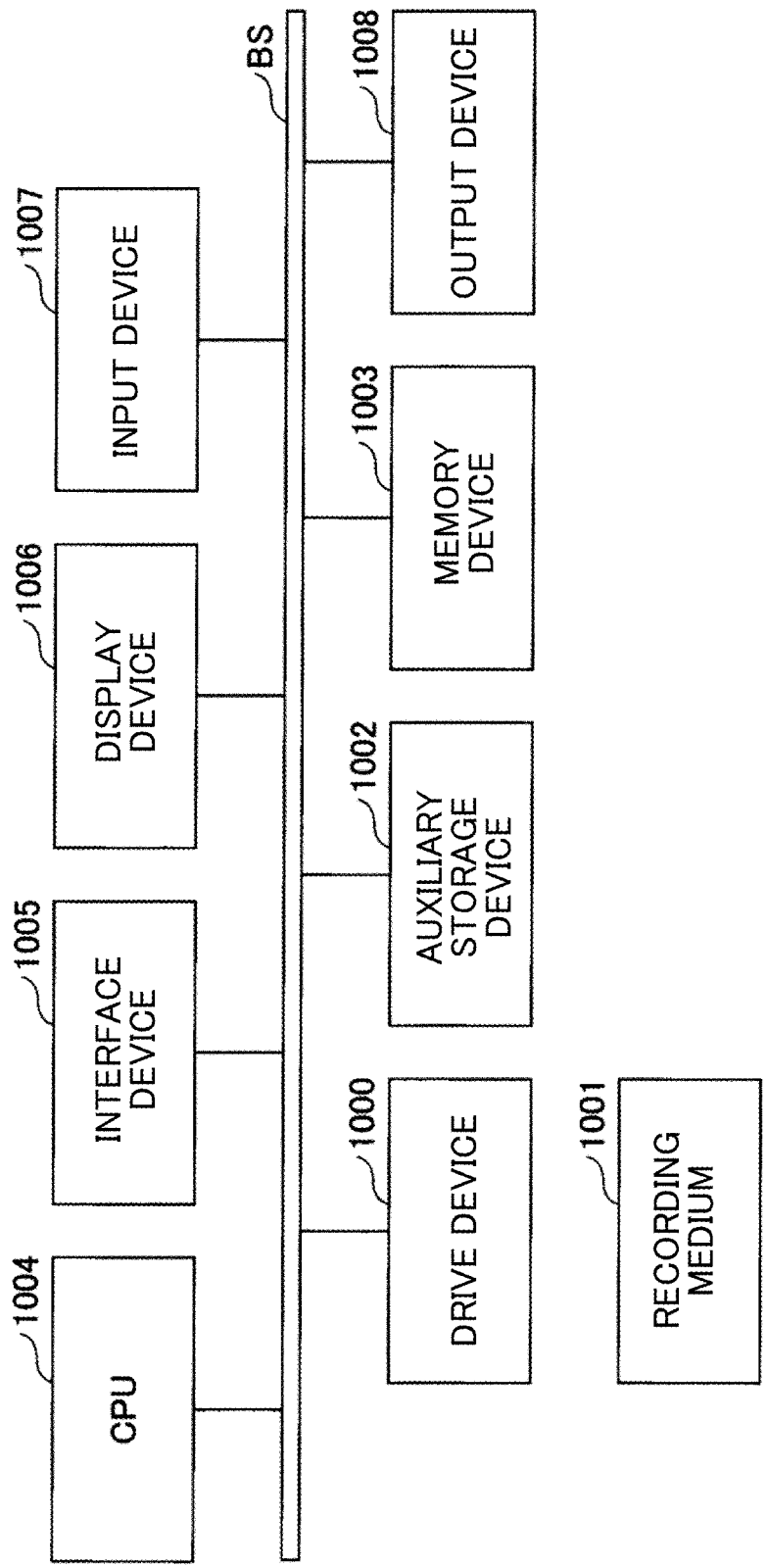
FIG. 5 is a diagram showing an example hardware configuration.

FIG. 5 is a diagram showing an example hardware configuration of the computer. The computer in FIG. 5 has a drive device 1000, an auxiliary storage device 1002, a memory device 1003, a CPU 1004, an interface device 1005, a display device 1006, an input device 1007, an output device 1008, and the like that are connected to each other by a bus BS.

A program for realizing the processing of the computer is provided by a recording medium 1001 such as a CD-ROM or a memory card, for example. When the recording medium 1001 storing the program is set in the drive device 1000, the program is installed onto the auxiliary storage device 1002 from the recording medium 1001 via the drive device 1000. However, the program does not necessarily need to be installed from the recording medium 1001, and may be downloaded from another computer via a network. The auxiliary storage device 1002 stores necessary files, data, and the like, together with storing the installed program.

The memory device 1003 reads out and stores the program from the auxiliary storage device 1002, if there is a program activation instruction. The CPU 1004 realizes the functions related to the power management apparatus 100, in accordance with the program stored in the memory device 1003. The interface device 1005 is used as an interface for connecting to a network. The display device 1006 displays a GUI (graphical user interface) of the program, and the like. The input device 1007 is constituted by a keyboard and a mouse, buttons, a touch panel, or the like, and is used in order to allow input of various operating instructions. The output device 1008 outputs calculation results and the like.

Examples of Power Distribution Control Between Locations

Next, examples of power distribution control based on a power distribution method determined by the power management apparatus 100 will be described with reference to FIGS. 6 to 10. Note that, as used in the following description, the expression "state of charge of a power storage unit" means the state of charge of a storage battery constituting the power storage unit.

Figure 6:
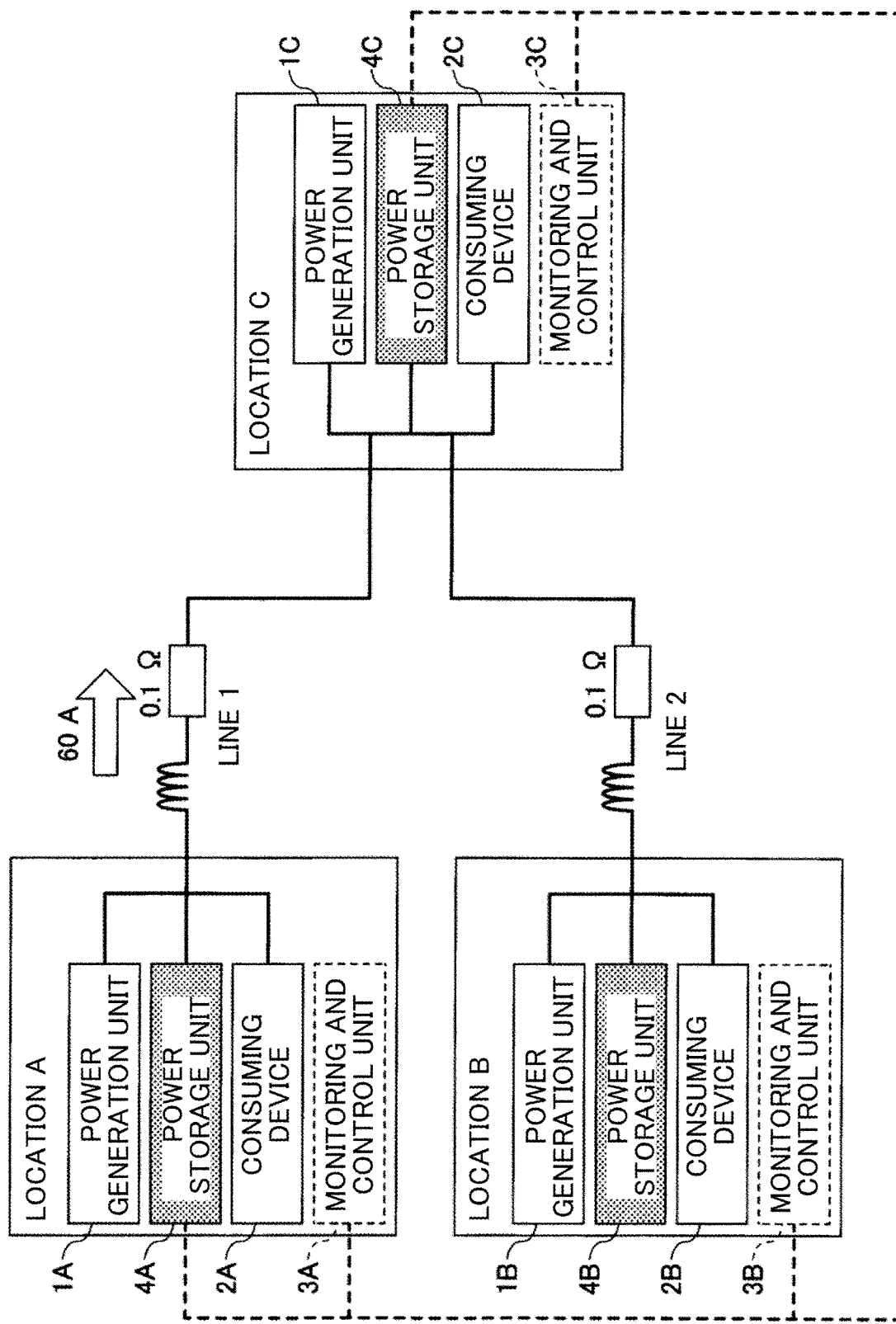
FIG. 6 is a diagram for describing an example of power distribution.

System configurations shown in FIGS. 6 to 9 are the same. As shown in FIG. 6, this system is constituted by a location A, a location B, and a location C. The locations A and C are connected to each other via a cable serving as a line 1, and the locations B and C are connected to each other via a power distribution cable serving as a line 2.

All of FIGS. 6 to 9 show examples in the case where DC power is supplied from a power storage unit 4A/4B at the location A/location B to a power storage unit 4C at the location C. However, these are merely examples, and the power supply side may be a power generation unit 1A/1B (by using surplus power), or the power receiving side may be a consuming device 2C.

Basically, it is assumed that power of the power storage unit 4A/4B that has been charged by the power generation unit 1A/1B in the daytime is supplied to the power storage unit 4C at nighttime during which the consuming device 2C is not used, to thereby keep the power storage unit 4C fully charged. Moreover, to the extent possible, a fixed quantity of electricity is supplied at a low current level for a long period of time. Furthermore, when possible, power is supplied from both the power storage unit 4A and the power storage unit 4B to the power storage unit 4C. The reason for this is as follows.

Electric power is given by $P=2\times I^2 \times R$ [W], and electric energy loss is given by $W=P\times t$ [Wh], where I represents a current value, R represents a resistance value, and t represents the duration of power distribution. For example, when a current I is passed from the location A to the location C for a duration t with the resistance value between the locations A and C being R, the electric energy loss during power distribution is "$2\times I^2 \times R\times t$". On the other hand, when a current I/2 is passed for a duration 2t, the electric energy loss during power distribution is "2×(I/2)²×R×2t=I²×R×t". That is to say, the electric energy loss is halved.

Furthermore, when a current I/2 is passed from the location A to the location C for a duration t with the resistance value between the locations B and C also being R, and at the same time a current I/2 is passed from the location B to the location C for the duration t, the electric energy loss during power distribution is "2×(2×(I/2)²×R×t)=I²×R×t". That is to say, in this case as well, the electric energy loss is halved.

Therefore, as described above, power is supplied at the lowest possible current level for a long period of time, or supplied from a plurality of locations. Hereinafter, situations of FIGS. 6 to 9 will be sequentially described.

In the example shown in FIG. 6, for example, the power management apparatus 100 detects at nighttime that the state of charge of the power storage unit 4C at the location C is lower than a threshold value X (e.g., X=40%) and thus determines that power should be supplied to the power storage unit 4C, and also detects that the state of charge of the power storage unit 4A at the location A is higher than a threshold value Y (e.g., X=80%) and thus determines that power should be supplied from the power storage unit 4A to the power storage unit 4C.

Here, it is assumed that it is determined that the power storage unit 4C should be charged using 60 Ah of electricity based on the remaining electric capacity therein. Moreover, it is assumed that the duration of power distribution is determined to be one hour. As shown in FIG. 6, 60 A of current is supplied from the power storage unit 4A to the power storage unit 4C for one hour.

Hereinafter, the power loss in the line 1 is represented by P1, the power loss in the line 2 is represented by P2, the electric energy loss in the line 1 is represented by W1, and the electric energy loss in the line 2 is represented by W2.

In the example of FIG. 6, P1=2×(60 A)²×0.1Ω=0.72 [kW], P2=0, W1=0.72 kW×1 h=0.72 [kWh], and W2=0.

Figure 7:
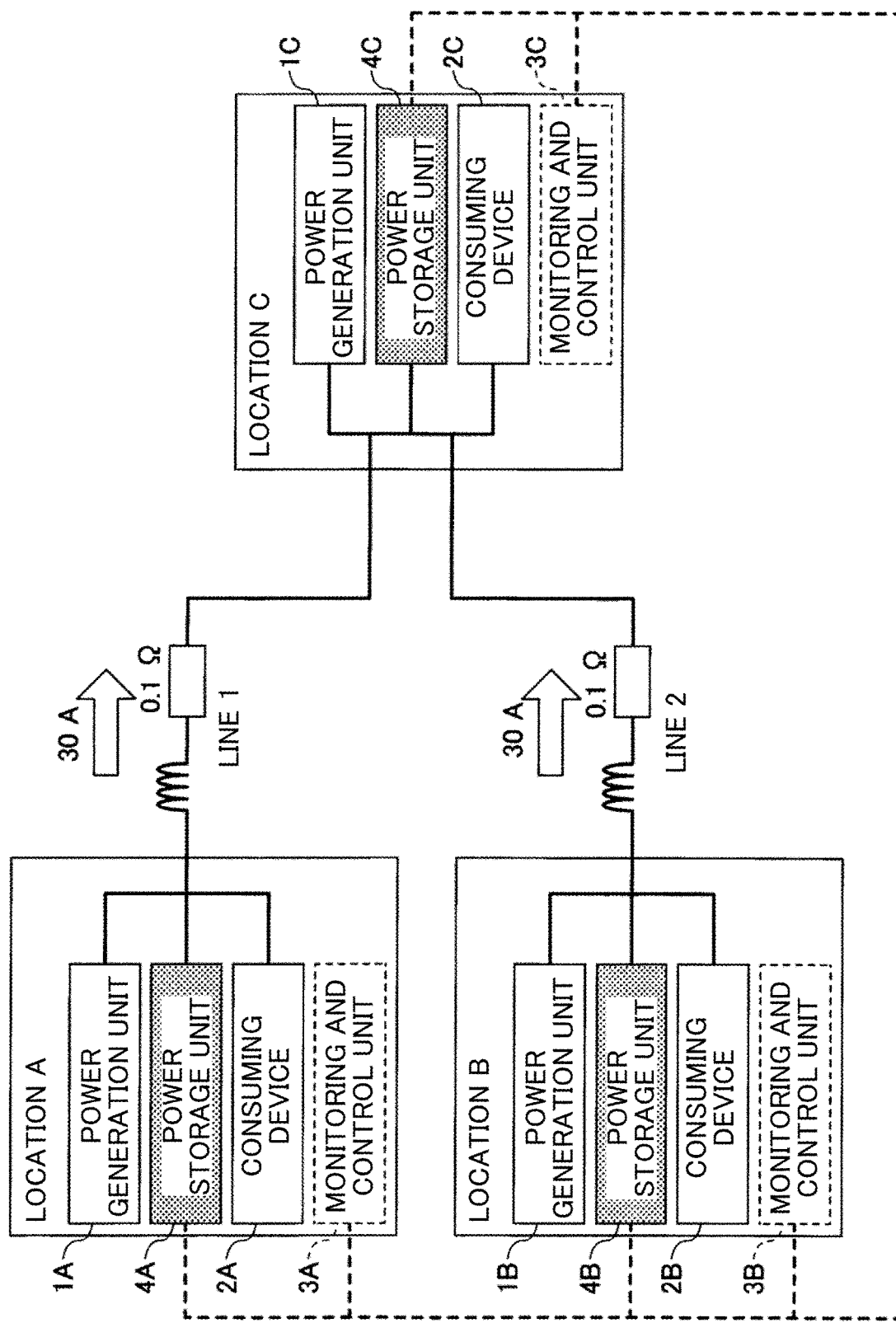
FIG. 7 is a diagram for describing an example of power distribution.

In the example shown in FIG. 7, for example, the power management apparatus 100 detects at nighttime that the state of charge of the power storage unit 4C at the location C is lower than the threshold value X and determines that power should be supplied to the power storage unit 4C, and also detects that the state of charge of the power storage unit 4A at the location A and the state of charge of the power storage unit 4B at the location B are both higher than the threshold value Y and determines that power should be supplied from both the power storage unit 4A and the power storage unit 4B to the power storage unit 4C through two lines.

In this example as well, it is assumed that it is determined that charging should be performed for one hour using 60 Ah of electricity. Since two lines are used, the amount of current per single line is halved, and thus, 30 A of current is supplied from the power storage unit 4A to the power storage unit 4C for one hour, and 30 A of current is supplied from the power storage unit 4B to the power storage unit 4C for one hour.

In the example of FIG. 7, P1=2×(30 A)²×0.1Ω=0.18 [kW], P2=2×(30 A)²×0.1Ω=0.18 [kW], W1=0.18 kW×1 h=0.18 [kWh], and W2=0.18 kW×1 h=0.18 [kWh].

In the case of FIG. 7 (in the case of 2 lines), the total electric energy loss is W1+W2=0.36 [kWh], which is half the electric energy loss in the case of FIG. 6 (in the case of 1 line).

Figure 8:
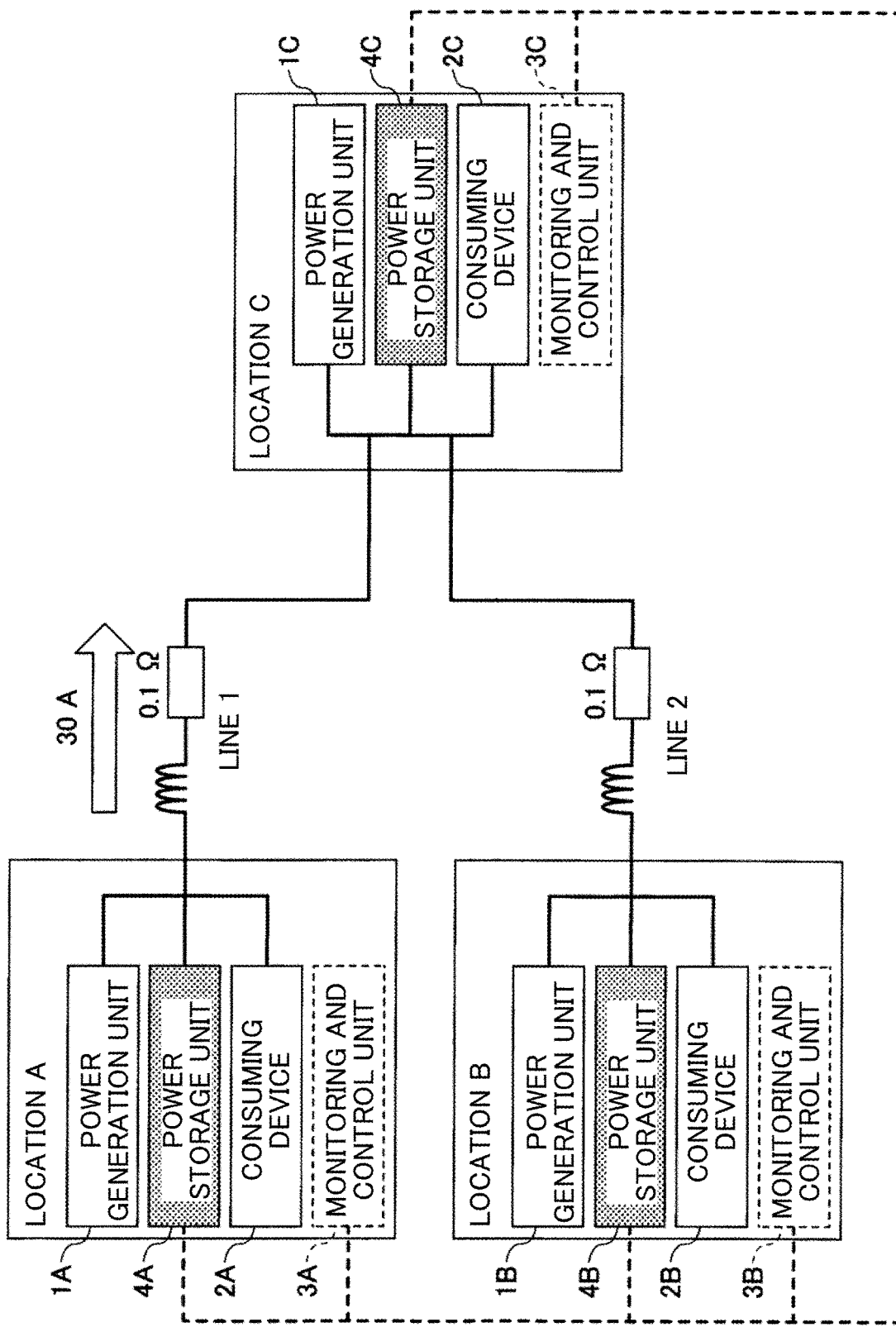
FIG. 8 is a diagram for describing an example of power distribution.

In the example shown in FIG. 8, for example, the power management apparatus 100 detects at nighttime that the state of charge of the power storage unit 4C at the location C is lower than the threshold value X and thus determines that power should be supplied to the power storage unit 4C, and also detects that the state of charge of the power storage unit 4A at the location A is higher than the threshold value Y and thus determines that power should be supplied from the power storage unit 4A to the power storage unit 4C.

In this example as well, it is assumed that it is determined that charging should be performed using 60 Ah of electricity. However, in the example of FIG. 8, the power management apparatus 100 refers to the usage schedule of the consuming device 2C at the location C and judges that power supply can be performed for 2 hours. Thus, 30 A of current is supplied from the power storage unit 4A to the power storage unit 4C for 2 hours.

In the example of FIG. 8, P1=2×(30 A)²×0.1Ω=0.18 [kW], P2=0, W1=0.18 kW×2 h=0.36 [kWh], and W2=0. In the case of FIG. 8 (in the case of 1 line and 2 hours), the total electric energy loss is W1+W2=0.36 [kWh], which is half the electric energy loss in the case of FIG. 6 (in the case of 1 line and 1 hour).

Figure 9:
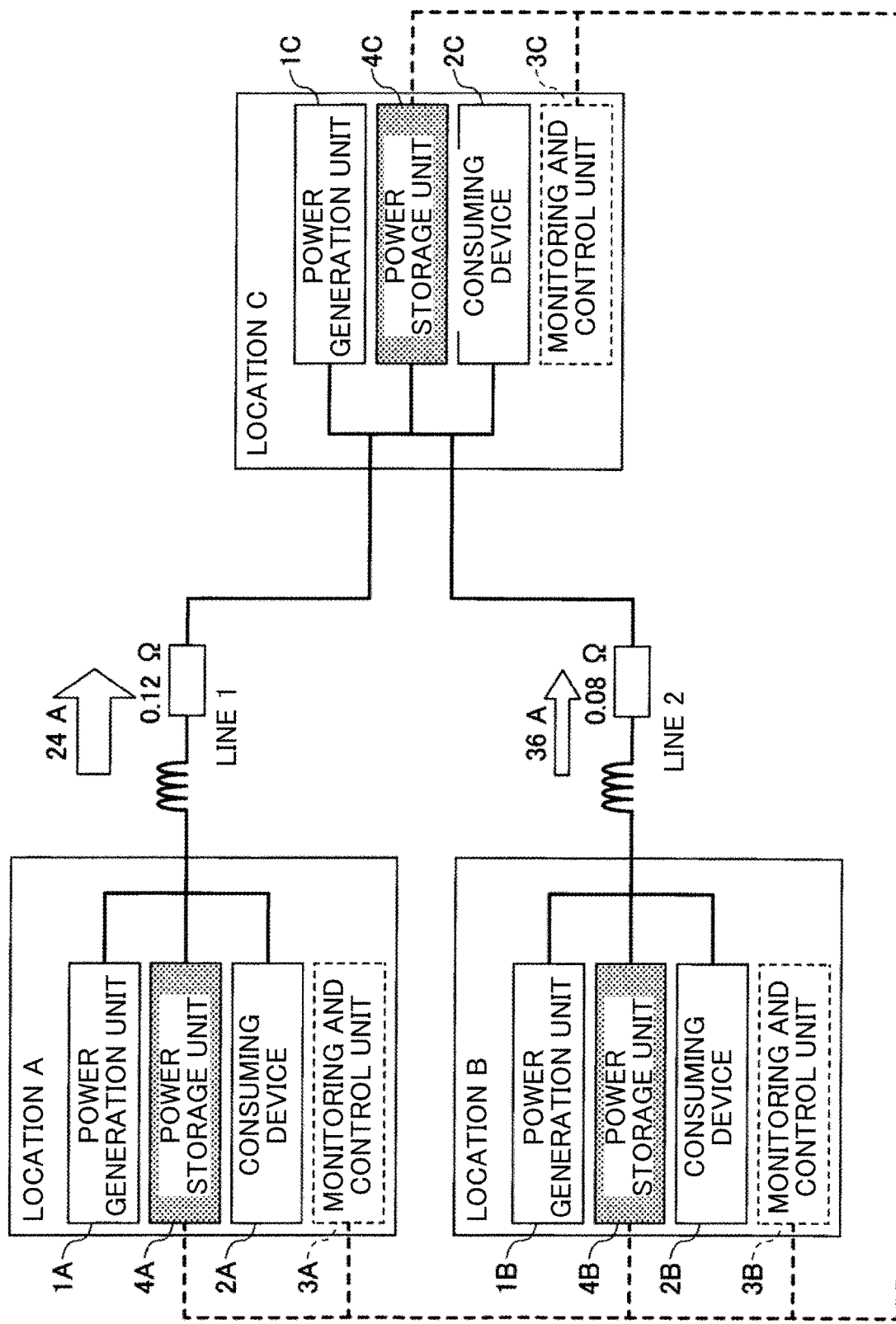
FIG. 9 is a diagram for describing an example of power distribution.

In the example shown in FIG. 9, for example, the power management apparatus 100 detects at nighttime that the state of charge of the power storage unit 4C at the location C is lower than the threshold value X and thus determines that power should be supplied to the power storage unit 4C, and also detects that the state of charge of the power storage unit 4A at the location A and the state of charge of the power storage unit 4B at the location B are both higher than the threshold value Y and thus determines that power should be supplied from both the power storage unit 4A and the power storage unit 4B to the power storage unit 4C through two lines.

In this example as well, it is assumed that it is determined that charging should be performed for one hour using 60 Ah of electricity. Moreover, in order to minimize the loss, the power management apparatus 100 allocates 60 A between the line 1 and the line 2 in the inverse ratio of the resistance value (=0.12Ω) of the line 1 and the resistance value (=0.08Ω) of the line 2. In this case, 60 A×(2/5)=24 A is the current value of the line 1, and 60 A×(3/5)=36 A is the current value of the line 2.

Accordingly, 24 A of current is supplied from the power storage unit 4A to the power storage unit 4C for one hour, and 36 A of current is supplied from the power storage unit 4B to the power storage unit 4C for one hour.

In the example of FIG. 9, P1=2×(24 A)²33 0.12Ω=0.13824 [kW], P2=2×(36 A)²×0.08Ω=0.20736 [kW], W1=0.13824 kW×1 h=0.13824 [kWh], and W2=0.20736 kW×1 h=0.20736 [kWh].

In the case of FIG. 9, the total electric energy loss is W1+W2=0.3456 [kWh], which is smaller than the electric energy loss in the case of FIG. 7 (in the case of 2 lines with equal current values). FIG. 10 is a diagram summarizing the results described above with reference to FIGS. 6 to 9.

Example Operation of Power Management Apparatus 100

Figure 11:
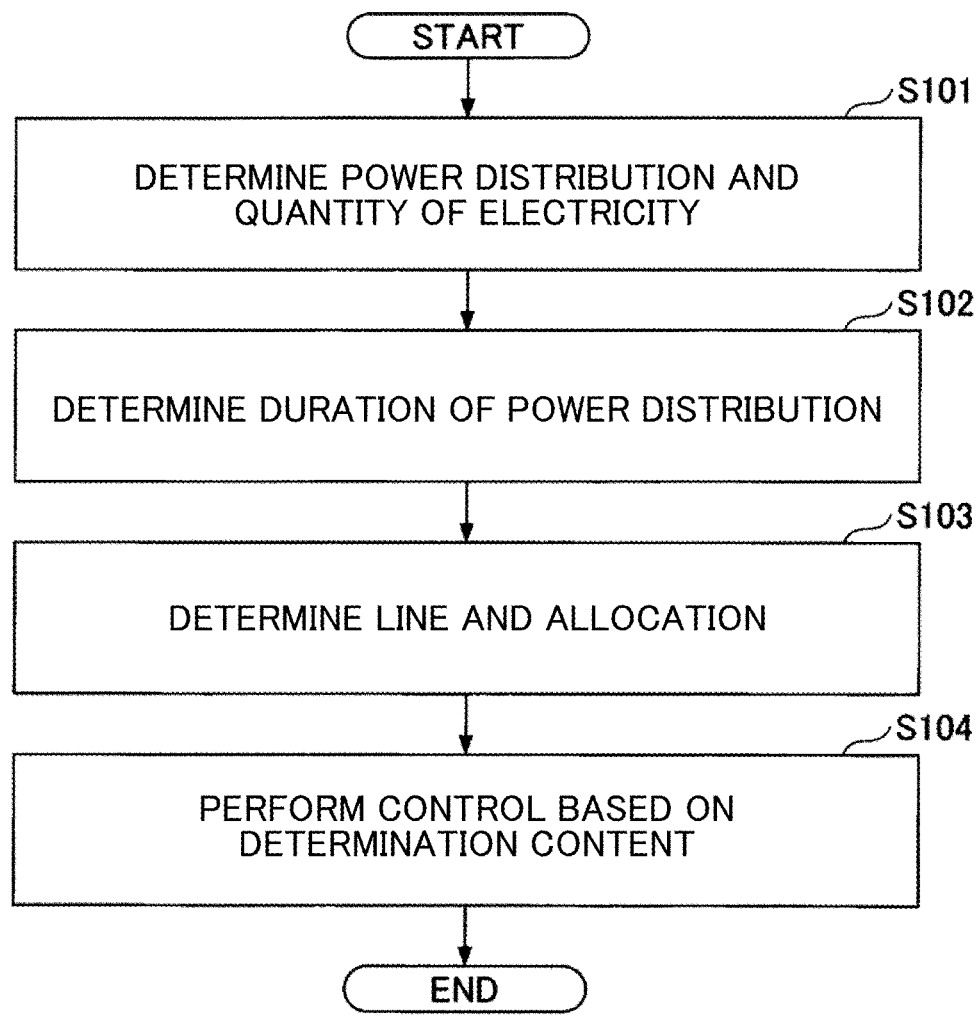
FIG. 11 is a flowchart for describing an example operation of the power management apparatus.

Next, an example operation related to power distribution control of the power management apparatus 100 will be described with reference to a flowchart shown in FIG. 11.

In S101, the judgment unit 130 detects a trigger for power distribution based on measured values and the like acquired from each location by the monitor unit 120. For example, the judgment unit 130 detects that "the current time is in a nighttime period (e.g., between 23:00 and 4:00)", "the state of charge of a power storage unit 4C at a certain location (e.g., the location C) is lower than the threshold value X", and "there is another location that has a line connecting to the location C and a power storage unit whose state of charge is higher than or equal to the threshold value Y". With this detection as a trigger, the judgment unit 130 determines that power should be distributed from the other location to the power storage unit 4C. Moreover, based on the state of charge of the power storage unit 4C, the quantity of electricity required to fully charge the power storage unit 4C is determined.

In S102, the judgment unit 130 determines the duration of power distribution by referring to the schedule at the location C that is stored in the data storage unit 150. Here, it is determined that power distribution should be performed for as long a duration as possible in a time period when the consuming device 2C is not used. For example, if the consuming device 2C is scheduled to be used from 8:00, the judgment unit 130 determines that power distribution should be performed for 2 hours from the current time (e.g., 2:00) to 4:00, which is a finishing time defined as "nighttime".

In S103, the judgment unit 130 determines a location serving as a distribution source. In other words, it determines a line that is to be used for power distribution. For example, a "location that has a line connecting to the location C and a power storage unit whose state of charge is higher than or equal to the threshold value Y" is determined as the location serving as a distribution source. If there is a single location that fulfills the conditions, this location serves as a distribution source. On the other hand, if there are a plurality of locations that fulfill the conditions, the plurality of locations serve as distribution sources. Moreover, the judgment unit 130 determines the values of current that is passed through the individual lines using the inverse ratio of the resistance values of the respective lines. For example, when "resistance value of line 1:resistance value of line 2:resistance value of line 3=1:2:3", the current value (quantity of electricity required for fully charging/duration of power distribution) to be distributed to the power storage value 4C is proportionally divided among the lines in the ratio of "current value of line 1:current value of line 2:current value of line 3=3:2:1".

In S104, based on the content of determination by the judgment unit 130, the control unit 140 instructs the monitoring and control unit at each location serving as a distribution source to distribute power to the location C at the determined current value for the determined duration.

The monitoring and control unit at each location sets the output current value for the converter of the power storage unit in accordance with the instruction and thereby performs control such that power is distributed at the determined current value.

Effects of Embodiment and Conclusion

As described above, according to the present embodiment, it is possible to flexibly control power distribution between locations and thereby reduce power loss during distribution.

The present specification describes at least the power management apparatus, power distribution control method, and program according to the following items.

(Item 1)

A power management apparatus for controlling power distribution from a location that includes a storage battery and a current control type converter to another location that includes a storage battery, the power management apparatus including:

a monitor unit that acquires a status of the storage battery at each location;

a judgment unit that determines, based on the status of the storage battery at each location that has been acquired by the monitor unit, a duration of power distribution to a certain location, and one or more locations from which power is to be distributed to the certain location; and a control unit that controls each location serving as a distribution source such that power distribution is performed for the duration determined by the judgment unit.

(Item 2)

The power management apparatus according to item 1, wherein the judgment unit determines the duration of power distribution such that the duration is as long as possible, based on the status of the storage battery and a load usage schedule at the location serving as a distribution destination.

(Item 3)

The power management apparatus according to item 1 or 2, wherein, when performing power distribution from a plurality of locations to a single location, the judgment unit proportionally divides an amount of current that is to be distributed to the location serving as a distribution destination between or among a plurality of lines connecting the respective locations serving as distribution sources to the location serving as the distribution destination in an inverse ratio of resistance values of the plurality of lines.

(Item 4)

A power distribution control method performed by a power management apparatus for controlling power distribution from a location that includes a storage battery and a current control type converter to another location that includes a storage battery, the method including:

a monitoring step of acquiring a status of the storage battery at each location;

a judgment step of determining, based on the status of the storage battery at each location that has been acquired in the monitoring step, a duration of power distribution to a certain location, and one or more locations from which power is to be distributed to the certain location; and a control step of controlling each location serving as a distribution source such that power distribution is performed for the duration determined in the judgment step.

(Item 5)

A program for causing a computer to function as the units of the power management apparatus according to any one of items 1 to 3.

Although an embodiment has been described above, the present invention is not limited to this specific embodiment, and various modifications and changes can be made within the scope of the gist of the invention as described in the claims.

REFERENCE SIGNS LIST 1A, 1B, 1C Power generation unit
2A, 2B, 2C Consuming device
3A, 3B Power distribution unit
4A, 4B, 4C Power storage unit
41A, 41B, 52, 60, 62 Storage battery
10A, 10B Power distribution grid
31A, 31B, 31C, 63 Monitoring and control unit
51 Rectifier
53 PV
54 to 56 Converter
57 DC bus
58 Distribution board
59, 61 Load
100 Power management apparatus 110 Input unit
120 Monitor unit
130 Judgment unit
140 Control unit
150 Data storage unit
200 Network
1000 Drive device
1001 Recording medium
1002 Auxiliary storage device
1003 Memory device
1004 CPU
1005 Interface device
1006 Display device
1007 Input device
1008 Output device

The invention claimed is:

1. A power management apparatus for controlling power distribution from a location that includes a storage battery and a current control type converter to another location that includes a storage battery, the power management apparatus comprising:
    a processor; and
    a memory storing program instructions that cause the processor to:
    acquire a status of the storage battery at each location;
    determine, based on the acquired status of the storage battery at each location, a duration of power distribution to a certain location, and one or more locations from which power is to be distributed to the certain location; and
    control each location serving as a distribution source such that power distribution is performed for the determined duration.

2. The power management apparatus according to claim 1,
    wherein the program instructions cause the processor to determine the duration of power distribution such that the duration is as long as possible, based on the status of the storage battery and a load usage schedule at the location serving as a distribution destination.

3. The power management apparatus according to claim 1,
    wherein, when performing power distribution from a plurality of locations to a single location, the program instructions cause the processor to proportionally divide an amount of current that is to be distributed to the location serving as a distribution destination between or among a plurality of lines connecting the respective locations serving as distribution sources to the location serving as the distribution destination in an inverse ratio of resistance values of the plurality of lines.

4. A power distribution control method performed by a power management apparatus for controlling power distribution from a location that includes a storage battery and a current control type converter to another location that includes a storage battery, the method comprising:
    acquiring a status of the storage battery at each location;
    determining, based on the acquired status of the storage battery at each location, a duration of power distribution to a certain location, and one or more locations from which power is to be distributed to the certain location; and
    controlling each location serving as a distribution source such that power distribution is performed for the duration determined in the determining.

5. A non-transitory computer-readable recording medium having stored therein a program for causing a computer to perform the power distribution control method according to claim 4.

* * * * *